United States Patent
Møller et al.

(10) Patent No.: US 12,288,569 B2
(45) Date of Patent: *Apr. 29, 2025

(54) AUDIO TIME SYNCHRONIZATION USING PRIORITIZED SCHEDULE

(71) Applicant: Roku, Inc., San Jose, CA (US)

(72) Inventors: Brian Thoft Moth Møller, Hojberg (DK); Paul Fleischer, Aarhus (DK); Bjørn Reese, Aarhus (DK)

(73) Assignee: ROKU, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/424,350

(22) Filed: Jan. 26, 2024

(65) Prior Publication Data

US 2024/0161785 A1    May 16, 2024

Related U.S. Application Data

(63) Continuation of application No. 17/897,894, filed on Aug. 29, 2022, now Pat. No. 11,922,976, which is a
(Continued)

(51) Int. Cl.
*G11B 27/10* (2006.01)
*H04N 21/43* (2011.01)
(Continued)

(52) U.S. Cl.
CPC ....... *G11B 27/10* (2013.01); *H04N 21/43072* (2020.08); *H04N 21/43615* (2013.01);
(Continued)

(58) Field of Classification Search
None
See application file for complete search history.

(56) References Cited

U.S. PATENT DOCUMENTS

| 4,731,676 A | 3/1988 | Berlekamp |
| 4,907,080 A | 3/1990 | Campbell et al. |

(Continued)

FOREIGN PATENT DOCUMENTS

| WO | WO 2006/053704 | 5/2006 |
| WO | WO 2012/018300 | 2/2012 |
| WO | WO 2013/184792 | 12/2013 |

OTHER PUBLICATIONS

International Search Report issued in related application dated Jun. 3, 2016.
(Continued)

*Primary Examiner* — Mustafa A Amin
(74) *Attorney, Agent, or Firm* — STERNE, KESSLER, GOLDSTEIN & FOX P.L.L.C.

(57) ABSTRACT

Disclosed herein are system, method, and computer program product embodiments for synchronizing playback of an audio and/or video content. An embodiment operates by collectively selecting, by a first device in concert with a second device of a plurality of devices in a computer network session, and in accordance with a predetermined synchronization list comprising a first and second synchronization mechanism, the first synchronization mechanism over the second synchronization mechanism such that the first synchronization mechanism is more precise than the second synchronization mechanism. The first and second synchronization mechanisms are configured to provide a synchronized playback of the at least one of the audio content and the video content.

20 Claims, 2 Drawing Sheets

Related U.S. Application Data continuation of application No. 16/709,113, filed on Dec. 10, 2019, now Pat. No. 11,437,075, which is a continuation of application No. 15/547,111, filed as application No. PCT/DK2016/050023 on Jan. 27, 2016, now Pat. No. 10,614,856.

(51) Int. Cl.
    *H04N 21/436*    (2011.01)
    *H04N 21/439*    (2011.01)
    *H04N 21/44*     (2011.01)
    *H04N 21/654*    (2011.01)

(52) U.S. Cl.
    CPC ... *H04N 21/4394* (2013.01); *H04N 21/44008* (2013.01); *H04N 21/654* (2013.01)

(56) References Cited

U.S. PATENT DOCUMENTS

| | | |
|---|---|---|
| 6,173,022 B1 | 1/2001 | Mcpherson et al. |
| 6,192,397 B1 | 2/2001 | Thompson |
| 6,372,974 B1 | 4/2002 | Gross et al. |
| 6,598,172 B1 | 7/2003 | Vandeusen et al. |
| 7,301,092 B1 | 11/2007 | McNally et al. |
| 7,500,176 B2 | 3/2009 | Thomson et al. |
| 7,631,119 B2 | 12/2009 | Moore et al. |
| 10,614,856 B2 | 4/2020 | Møller et al. |
| 11,437,075 B2 | 9/2022 | Møller et al. |
| 2003/0017823 A1 | 1/2003 | Mager et al. |
| 2003/0018662 A1 | 1/2003 | Li |
| 2003/0164845 A1 | 9/2003 | Fayan et al. |
| 2005/0028195 A1 | 2/2005 | Feinleib et al. |
| 2005/0111827 A1 | 5/2005 | Sullivan |
| 2005/0198549 A1 | 9/2005 | Courant et al. |
| 2005/0213826 A1 | 9/2005 | Neogi |
| 2005/0217462 A1 | 10/2005 | Thomson et al. |
| 2005/0227674 A1 | 10/2005 | Kopra et al. |
| 2006/0146850 A1 | 7/2006 | Virdi et al. |
| 2006/0149850 A1 | 7/2006 | Bowman |
| 2006/0156375 A1 | 7/2006 | Konetski |
| 2006/0161835 A1 | 7/2006 | Panabaker et al. |
| 2006/0179160 A1 | 8/2006 | Uehara et al. |
| 2006/0227245 A1 | 10/2006 | Poimboeuf et al. |
| 2006/0242106 A1 | 10/2006 | Bank |
| 2006/0270395 A1 | 11/2006 | Dhawan et al. |
| 2007/0079352 A1 | 4/2007 | Klein |
| 2007/0136769 A1 | 6/2007 | Goldberg et al. |
| 2007/0143493 A1 | 6/2007 | Mullig et al. |
| 2007/0250761 A1 | 10/2007 | Bradley et al. |
| 2008/0120501 A1 | 5/2008 | Jannink et al. |
| 2008/0168182 A1 | 7/2008 | Frank et al. |
| 2009/0135854 A1 | 5/2009 | Bettin et al. |
| 2009/0222520 A1 | 9/2009 | Sloo et al. |
| 2013/0155209 A1 | 6/2013 | Hara |
| 2014/0013008 A1 | 1/2014 | Lazarus et al. |
| 2014/0181270 A1 | 6/2014 | Millington |
| 2014/0269776 A1 | 9/2014 | Bomfim et al. |
| 2018/0012632 A1 | 1/2018 | Møller et al. |
| 2020/0118595 A1 | 4/2020 | Møller et al. |
| 2023/0066005 A1 | 3/2023 | Møller et al. |

OTHER PUBLICATIONS

Written Opinion issued in related application dated Jun. 3, 2016.
Yen et al "On the Synchronization Mechanisms for Multimedia Integrated Services Networks", *School of Electrical and Computer Engineering;* Georgia Institute of Technology, Atlanta, GA: Nov. 13, 1994, pp. 168-184.

AUDIO TIME SYNCHRONIZATION USING PRIORITIZED SCHEDULE

CROSS-REFERENCE TO RELATED APPLICATIONS

This application is a continuation of U.S. patent application Ser. No. 17/897,894, filed on Aug. 28, 2022, which is a continuation of U.S. patent application Ser. No. 16/709,113, filed on Dec. 10, 2019, which is a continuation of U.S. patent application Ser. No. 15/547,111, filed on Jul. 28, 2017, which is a U.S. national phase application of PCT/DK2016/050023, filed on Jan. 27, 2016, which are incorporated herein by reference in their entireties.

FIELD OF THE INVENTION

The present invention relates to the field of synchronized playback of audio or video between devices in a peer-to-peer computer network system, e.g. in a wi-fi network.

BACKGROUND OF THE INVENTION

In synchronized playback of audio or video between a plurality of devices in a peer-to-peer computer network system, the devices can participate in coordinated sessions, where the participating devices can play synchronously. The participating devices can be located within or across several rooms.

One of the key parameters of providing precise audio playback synchronization is the ability to maintain a common reference time between multiple loudspeakers in a peer-to-peer audio playback network system. E.g. precise timing between left and right stereo loudspeaker in a stereo setup is crucial in order to obtain a perceived stereo image without any perceivable displacement of the spatial location of the center of the stereo image. Even timing differences below hundreds of microseconds between left and right loudspeaker in a stereo setup may result in a disturbed stereo image. Further, synchronization is required of audio and video between e.g. a loudspeaker device playing the audio part and a display device, e.g. a TV set, showing the video part of audio/video material. The synchronization requirements between the TV and the loudspeakers are orders-of-magnitude lower than the requirements between stereo loudspeakers.

In order to playback synchronously, the participating devices need to agree on the playback time and pace. One of the key parameters of providing precise audio playback synchronization is the ability to share the same time between multiple devices in a network, especially a wireless network.

Solutions exist that have various means to achieve synchronized audio playback in wireless computer networks. Some of these systems use the system clock of the devices, others provide a hardware solution requiring each of the nodes in the network to run with dedicated hardware. Even when working without adjusting the system clocks as provided by the operating system, these solutions often use clocks that are derived from the system clock, adjusted with a frequency and offset component to match some remote system. However, such synchronization is in general not accurate.

SUMMARY OF THE INVENTION

Thus, according to the above description, it is an object of the present invention to provide an accurate way of providing synchronized playback of audio and/or video in a computer network of a plurality of devices.

In a first aspect, the invention provides a method for synchronizing playback of audio and/or video from a source in computer network of a plurality of separate devices in a computer network session, see appended claim 1.

In this method, the best-effort session synchronization mechanism is selected from a hierarchy of heterogeneous synchronization mechanisms. In other words, a prioritized schedule is used to select the synchronization mechanism to be used.

Such method provides a general way of allowing different types of devices to be combined to playback time synchronous audio and/or video in a computer network session, and to still obtain the most precise time synchronization possible.

A session is directed by a session master (or session leader) which has a lowest common denominator synchronization mechanism. Subsets of participating devices may group together to use a better synchronization mechanism within the group, with a group master that synchronizes the group with the session master (session leader).

By using different synchronization mechanisms for different separate devices in a session, it is possible to achieve a better synchronization between devices with higher synchronization requirements, such as between the left and right loudspeakers for stereo audio playback. In comparison, the synchronization between two devices located in different rooms is relaxed, and can thus be implemented by another synchronization mechanism.

In the dependent claims 2-20, a number of embodiments and/or preferred features will be defined.

By 'audio clock' is understood a synchronization mechanism provided by the audio codec used to stream the audio of the audio and/or video content.

In a second aspect, the invention provides a protocol for controlling a plurality of separate devices in a computer network.

In a third aspect, the invention provides a computer executable program code, or a programmable- or fixed hardware, and/or combination hereof, arranged to perform the method according to the first aspect, or causes a device with a processor to function according to the protocol of the second aspect. The computer executable program code may be stored on a data carrier. The program code may be implemented to function on any type of processor platform.

In a fourth aspect, the invention provides a device that operates according to the method or protocol of the first or second aspect. Especially, the device may be an audio device, such as a stand-alone active loudspeaker. The device may also be any other type of device with audio and/or video capabilities, e.g. a TV set.

In a fifth aspect, the invention provides a system of a plurality of devices according to the fourth aspect, e.g. mixed types of devices arranged to take part in a computer network session, e.g. a wi-fi network session, of synchronized playback of audio and/or video content.

In a sixth aspect, the invention provides an electronic chip programmed to allow a device to operate according to protocol according to the third aspect, if provided with access to the electronic chip, e.g. if the device has the chip installed therein.

It is appreciated that the same advantages and embodiments described for the first aspect apply as well for the second, third, fourth, fifth, and sixth aspects. Further, it is appreciated that the described embodiments can be intermixed in any way between all the mentioned aspects.

BRIEF DESCRIPTION OF THE FIGURES

The invention will now be described in more detail with regard to the accompanying figures of which

The figures illustrate specific ways of implementing the present invention and are not to be construed as being limiting to other possible embodiments falling within the scope of the attached claim set.

DETAILED DESCRIPTION OF THE INVENTION

Figure 1:
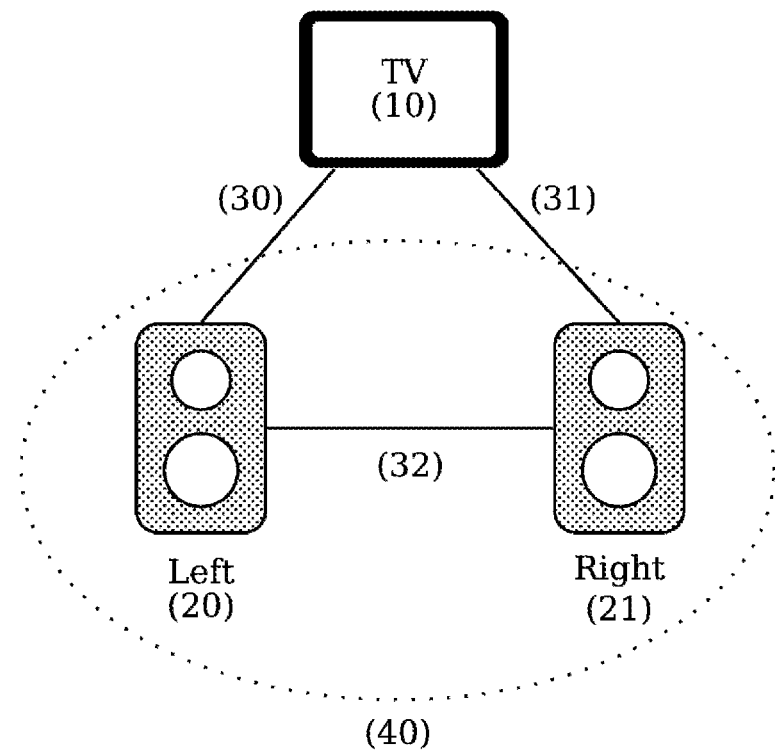
FIG. 1 shows a synchronization session with a TV (10) and a stereo set of loudspeakers, left and right (20 and 21), where the TV (10) is the session master (leader) and therefore provides the overall synchronization (30 and 31)

FIG. 1 shows a synchronization session with a TV (10) and two speakers (20 and 21). The TV (10) is the session master and therefore provides the overall synchronization (30 and 31). The Right speaker (21) and the Left speaker (20) form a group (40) wherein the Right speaker (21) acts as the group master. The group master (21) synchronizes against the session master (10). The Left speaker (20) ignores the synchronization from the session master (10) and instead uses the synchronization (32) from the group master (21).

Figure 2:
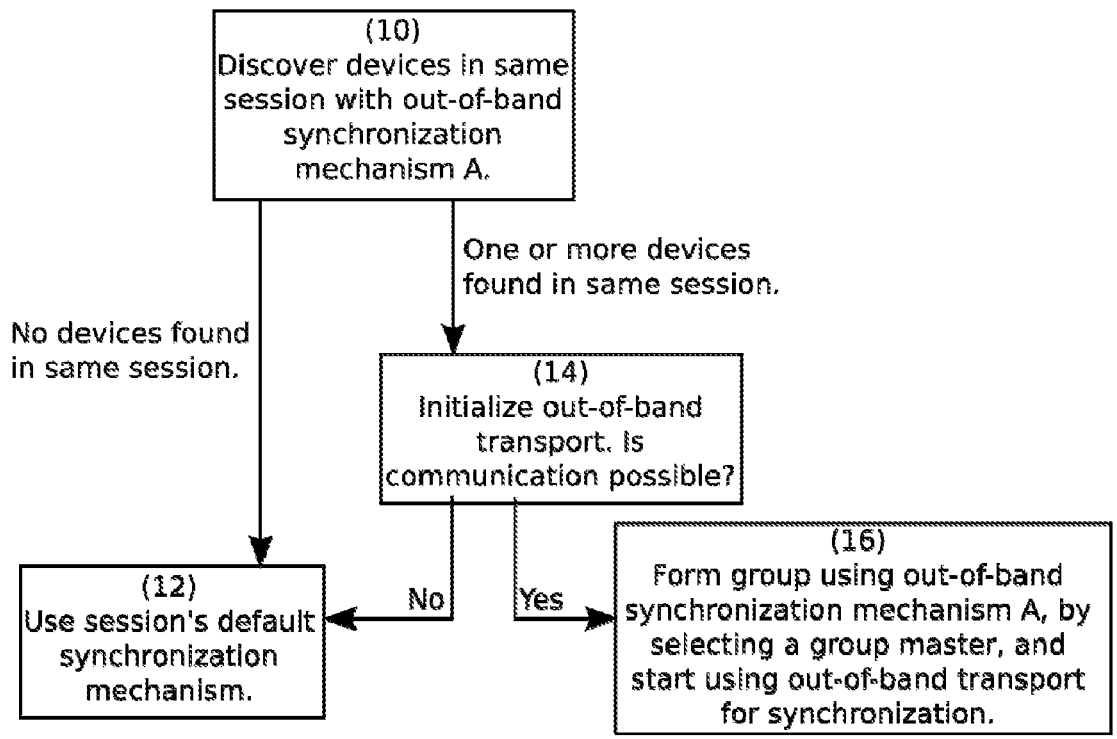
FIG. 2 illustrates a synchronization mechanism selection algorithm embodiment.

FIG. 2 illustrates a synchronization mechanism selection algorithm.

Figure 3:
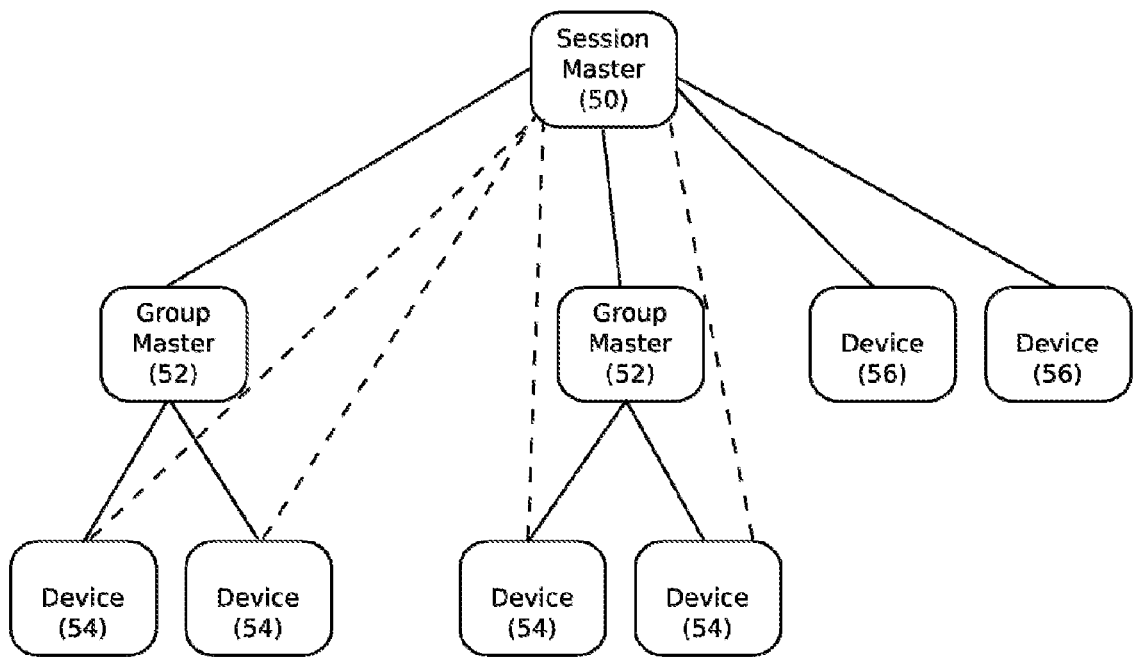
FIG. 3 illustrates an example of a synchronization hierarchy. The session master (leader) (50) is the authoritative time synchronization source for the session, and it provides timing information to all other devices (52), (54), and (56) via the session's default synchronization. Two groups have been formed with an out-of-band synchronization, each group having a group master (leader) (52) and two group members (54).

FIG. 3 illustrates a synchronization hierarchy: The session master (50) is the authoritative time source for the session. It provides timing information to all other devices (52), (54), and (56) via the session's default synchronization. Two groups have been formed with an out-of-band synchronization. Each group has a group master (52) and two group members (54). These use an out-of-band synchronization mechanism. As indicated by the dashed line, (54) still utilizes the default synchronization with the session master (50).

The group masters (52) also maintain a direct synchronization with the Session Master (50). Devices (56) do not use any out-of-band synchronization, and fall back to the default synchronization with the session master (50).

Figure 4:
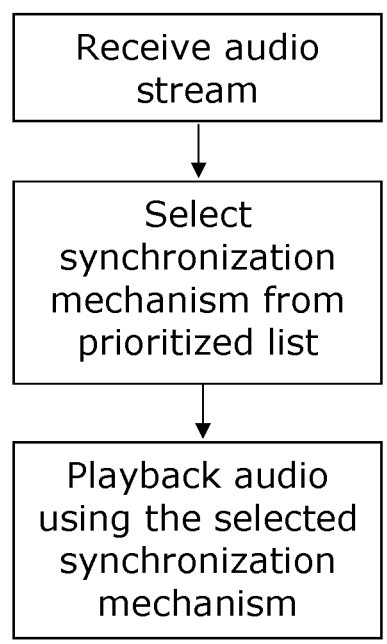
FIG. 4 illustrates steps of a clock synchronization selection algorithm embodiment.

FIG. 4 illustrates a simple example of a selection algorithm implemented in each of the separate devices taking part in a computer network session of synchronous playback of audio and/or video.

In a specific example, the prioritized list of synchronization mechanisms may include two or more of the following, in prioritized order:
1) a custom radio frequency (RF) based synchronization mechanism,
2) a custom infrared (IR) based synchronization mechanism,
3) a Global Positioning System (GPS) based synchronization mechanism,
4) a standard radio clock (e.g. DCF77 or WWVB) based synchronization mechanism, and
5) a Network Time Protocol (NTP) based synchronization mechanism.

To sum up: the invention provides a method for providing a synchronization in a computer network for synchronized playback of audio and/or video by a plurality of separate devices, e.g. in a wi-fi network. Each separate device is programmed to select a synchronization mechanism in accordance with a predetermined prioritized list of at least two different synchronization mechanisms, and to use the selected synchronization mechanism for synchronizing audio and/or video playback. E.g. use of a clock based on the audio codec clock can be set to a higher priority than use of the system clock, which provides a poorer precision. A session leader serves to provide the synchronization to other separate devices in a session, however a group of two or more separate devices within the session may agree on selecting a synchronization mechanism providing a higher precision than the one provided by the session leader. E.g. to allow high precision timing between separate left and right loudspeakers in a stereo setup. A group leader can be elected to provide synchronization to a group of devices using a higher synchronization precision than the synchronization mechanism provided by the overall session leader. E.g. a dedicated synchronization channel separate from the audio/video streaming channel may be selected.

Although the present invention has been described in connection with the specified embodiments, it should not be construed as being in any way limited to the presented examples. The scope of the present invention is to be interpreted in the light of the accompanying claim set. In the context of the claims, the terms "including" or "includes" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

What is claimed is:

1. A computer-implemented method for synchronizing playback of at least one of an audio content or a video content by a computer network session including a session master, the computer-implemented method comprising:
   determining, by at least one computer processor, a synchronization list including a default synchronization mechanism and a group synchronization mechanism, wherein the group synchronization mechanism has a higher precision than the default synchronization mechanism, wherein the computer network session includes the session master and a plurality of devices, wherein the plurality of devices includes a group master device and a group member device grouped into a device group; and
   providing, by the session master, the default synchronization mechanism to all the plurality of devices of the computer network session, wherein the group master device and the group member device ignore the default synchronization mechanism provided by the session master and agree on the group synchronization mechanism for synchronizing playback of at least one of the audio content or the video content.

2. The computer-implemented method of claim 1, further comprising:
  providing the default synchronization mechanism to a device of the computer network session not included in the device group.

3. The computer-implemented method of claim 1, wherein the group member device is configured for synchronizing playback of at least one of the audio content or the video content according to the group synchronization mechanism.

4. The computer-implemented method of claim 1, wherein the default synchronization mechanism is an audio clock.

5. The computer-implemented method of claim 1, wherein one of the default synchronization mechanism or the group synchronization mechanism includes a custom radio frequency-based synchronization mechanism, a custom infrared-based synchronization mechanism, a global positioning system based synchronization mechanism, a standard radio dock-based synchronization mechanism, or a network time protocol server-based synchronization mechanism.

6. The computer-implemented method of claim 1, wherein one of the default synchronization mechanism or the group synchronization mechanism operate within a communication channel on which the at least one of the audio content or the video content is streamed.

7. The computer-implemented method of claim 1, wherein the at least one of the audio content or the video content is streamed via a wireless channel.

8. The computer-implemented method of claim 1, wherein one of the group master device or the group member device is configured for synchronizing playback to a left or right stereo channel of an audio stream.

9. A non-transitory, computer-readable medium having instructions stored thereon that, when executed by a session master of a computer network session, cause the session master to perform operations comprising:
  determining a synchronization list including a default synchronization mechanism and a group synchronization mechanism, wherein the group synchronization mechanism has a higher precision than the default synchronization mechanism, wherein the computer network session includes the session master and a plurality of devices, wherein the plurality of devices includes a group master device and a group member device grouped into a device group; and
  providing, by the session master, the default synchronization mechanism to all the plurality of devices of the computer network session, wherein the group master device and the group member device ignore the default synchronization mechanism provided by the session master and agree on the group synchronization mechanism for synchronizing playback of at least one of an audio content or a video content.

10. The non-transitory, computer-readable medium of claim 9, the operations further comprising:
  providing the default synchronization mechanism to a device of the computer network session not included in the device group.

11. The non-transitory, computer-readable medium of claim 9, wherein the group member device is configured for synchronizing playback of at least one of the audio content or the video content according to the group synchronization mechanism.

12. The non-transitory, computer-readable medium of claim 9, wherein the default synchronization mechanism is an audio clock.

13. The non-transitory, computer-readable medium of claim 9, wherein one of the default synchronization mechanism or the group synchronization mechanism includes a custom radio frequency-based synchronization mechanism, a custom infrared-based synchronization mechanism, a global positioning system based synchronization mechanism, a standard radio dock-based synchronization mechanism, or a network time protocol server-based synchronization mechanism.

14. The non-transitory, computer-readable medium of claim 9, wherein one of the default synchronization mechanism or the group synchronization mechanism operate within a communication channel on which the at least one of the audio content or the video content is streamed.

15. The non-transitory, computer-readable medium of claim 9, wherein the at least one of the audio content or the video content is streamed via a wireless channel.

16. The non-transitory, computer-readable medium of claim 9, wherein one of the group master device or the group member device is configured for synchronizing playback to a left or right stereo channel of an audio stream.

17. A system, comprising:
  a network interface configured to provide at least one of an audio content or a video content via a computer network session for synchronizing playback of the at least one of the audio content or the video content by the computer network session, wherein the computer network session includes a session master and a plurality of devices, and wherein the plurality of devices includes a group master device and a group member device grouped into a device group; and
  a processor coupled to the network interface and configured to provide a default synchronization mechanism to all the plurality of devices of the computer network session, wherein the group master device and the group member device ignore the default synchronization mechanism provided by the session master and agree on a group synchronization mechanism having a higher precision than the default synchronization mechanism in accordance with a predetermined synchronization list including the default synchronization mechanism and the group synchronization mechanism.

18. The system of claim 17, the processor further configured to:
  provide the default synchronization mechanism to a device of the computer network session not included in the device group.

19. The system of claim 17, wherein the group member device is configured for synchronizing playback of at least one of the audio content or the video content according to the group synchronization mechanism.

20. The system of claim 17, wherein the default synchronization mechanism is an audio clock.

* * * * *

UNITED STATES PATENT AND TRADEMARK OFFICE
CERTIFICATE OF CORRECTION

| | | |
|---|---|---|
| PATENT NO. | : 12,288,569 B2 | Page 1 of 1 |
| APPLICATION NO. | : 18/424350 | |
| DATED | : April 29, 2025 | |
| INVENTOR(S) | : Møller et al. | |

It is certified that error appears in the above-identified patent and that said Letters Patent is hereby corrected as shown below:

On the Title Page

Column 1, Item (72), in "Inventors", Line 1, delete "Hojberg" and insert -- Højbjerg --, therefor.

Column 1, Item (72), in "Inventors", Line 2, delete "Aarhus" and insert -- Aarhus V --, therefor.

Column 1, Item (72), in "Inventors", Line 3, delete "Aarhus" and insert -- Aarhus V --, therefor.

In the Specification

In Column 8, Line 8, delete "Aug. 28, 2022," and insert -- Aug. 29, 2022, now U.S. Pat. No. 11,922,976, --, therefor.

In Column 1, Line 10, delete "2019," and insert -- 2019, now U.S. Pat. No. 11,437,075, --, therefor.

In Column 1, Line 13, delete "2016," and insert -- 2016, now U.S. Pat. No. 10,614,856, --, therefor.

In Column 3, Line 8, delete "31)," and insert -- 31). --, therefor.

Signed and Sealed this
Ninth Day of December, 2025

John A. Squires
*Director of the United States Patent and Trademark Office*